United States Patent
Lynch et al.

(10) Patent No.: US 9,578,283 B1
(45) Date of Patent: Feb. 21, 2017

(54) AUDIO LEVEL BASED MANAGEMENT OF COMMUNICATION RESOURCES

(71) Applicant: Avaya Inc., Basking Ridge, NJ (US)

(72) Inventors: John Lynch, Belleville (CA); Jon Bentley, New Providence, NJ (US); Parameshwaran Krishnan, Basking Ridge, NJ (US); Peter Tarle, Belleville (CA)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/976,454

(22) Filed: Dec. 21, 2015

(51) Int. Cl.
  *H04N 7/14* (2006.01)
  *G10L 25/84* (2013.01)
  *G10L 25/21* (2013.01)
  *H04N 7/15* (2006.01)

(52) U.S. Cl.
  CPC ............ *H04N 7/147* (2013.01); *G10L 25/21* (2013.01); *G10L 25/84* (2013.01); *H04N 7/15* (2013.01)

(58) Field of Classification Search
  CPC ...................................................... H04N 7/14
  USPC ................. 348/14.01, 14.08, 14.12, 14.14
  See application file for complete search history.

(56) References Cited

U.S. PATENT DOCUMENTS

| | | | |
|---|---|---|---|
| 7,768,543 B2 * | 8/2010 | Christiansen | H04L 29/06027 348/14.08 |
| 9,118,940 B2 * | 8/2015 | Valentine | H04N 7/152 |
| 9,379,999 B2 * | 6/2016 | Lynch | H04L 47/19 |
| 2012/0290305 A1 * | 11/2012 | Feng | G10L 19/002 704/500 |

* cited by examiner

*Primary Examiner* — Olisa Anwah

(57) ABSTRACT

Embodiments disclosed herein provide systems, methods, and computer readable media for managing bandwidth based on audio power level. In a particular embodiment, a method provides, from a conference system, transferring at least one audio level criterion to a first user system in a communication session. At the conference system, when a level of first audio for the communication session satisfies the at least one audio level criterion at the first user system, the method provides receiving the first audio encoded using first audio codec parameters by the first user system. At the conference system, when the level of the first audio does not satisfy the at least one audio level criterion at the first user system, the method provides receiving the first audio encoded using second audio codec parameters by the first user system.

20 Claims, 7 Drawing Sheets

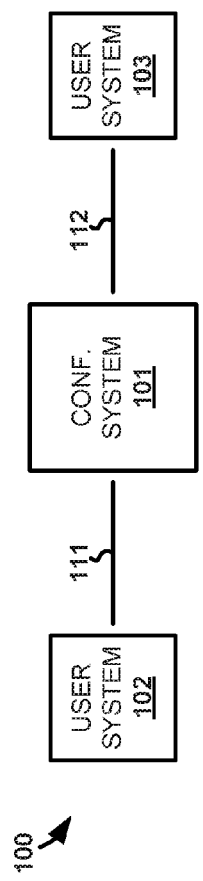
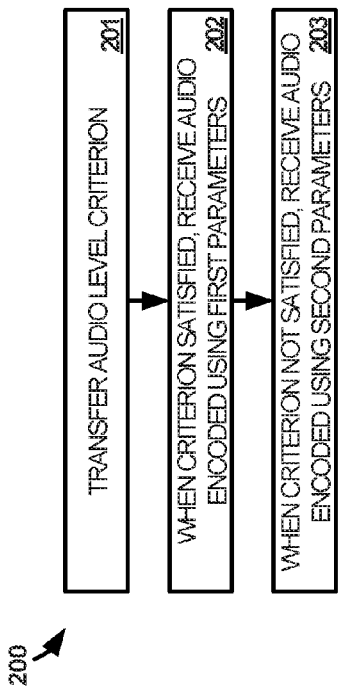
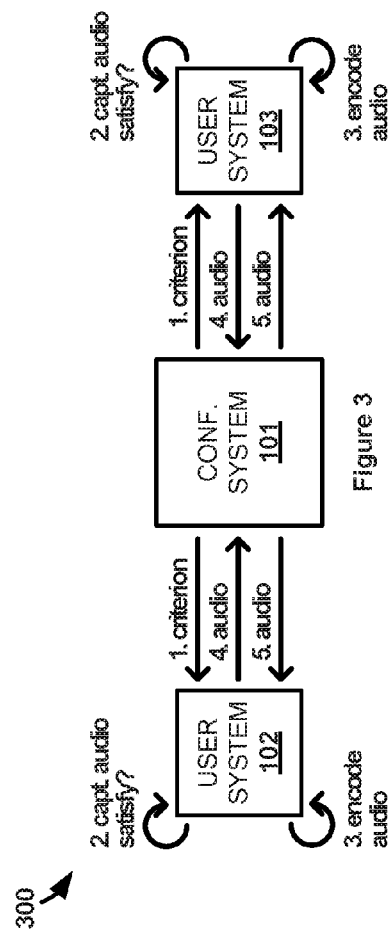

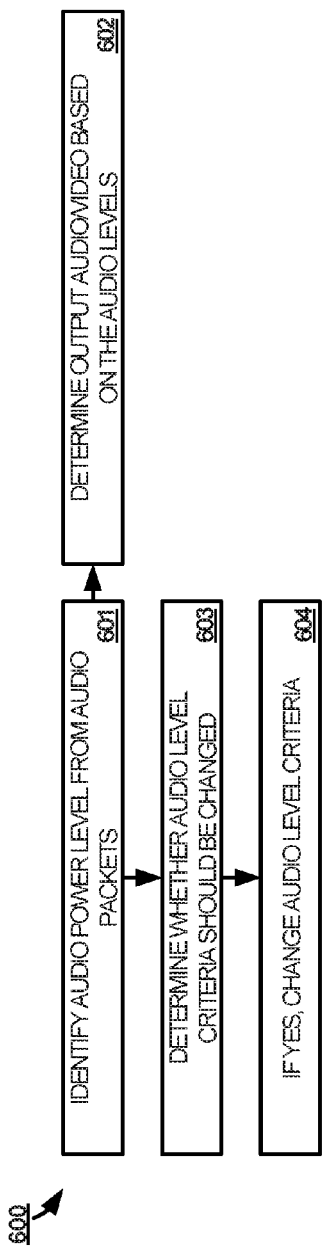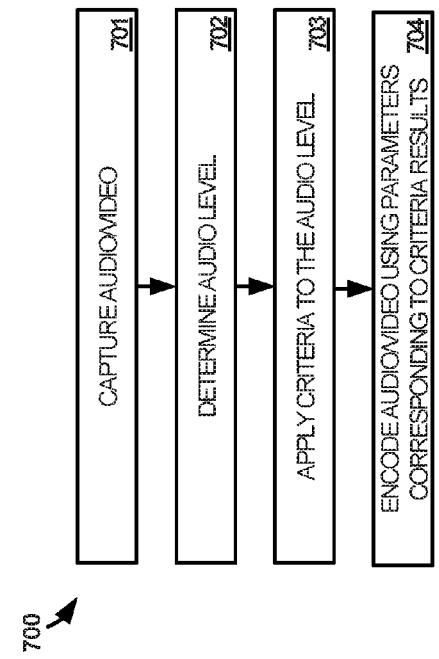

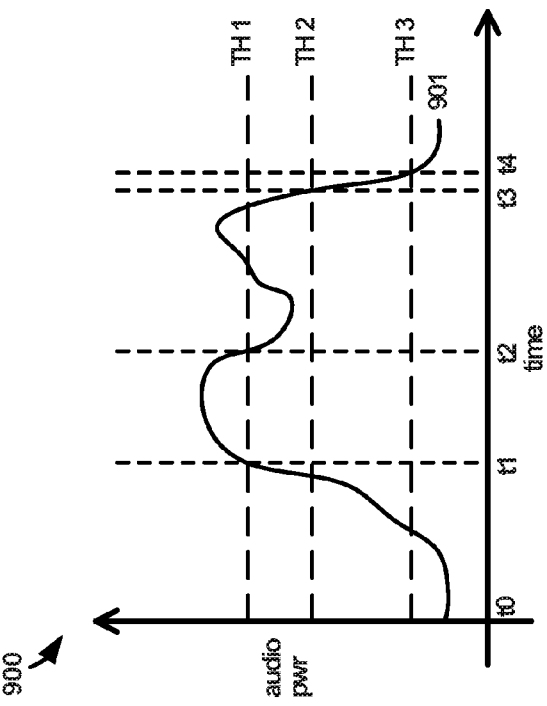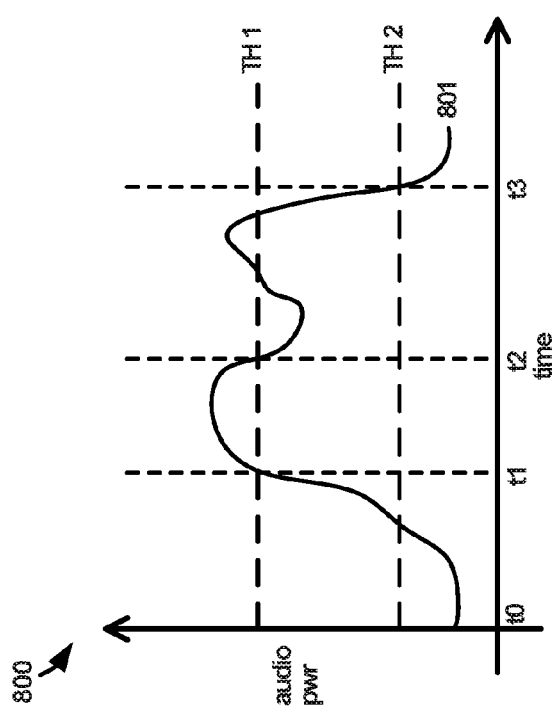

AUDIO LEVEL BASED MANAGEMENT OF COMMUNICATION RESOURCES

TECHNICAL BACKGROUND

Media server systems, such as conferencing systems, receive media streams from client devices on a communication, compile those media streams into at least one output media stream for the communication, and transfer the output stream back to the client devices. A server system may facilitate audio communications, video communications, or both, along with other accompanying media, such as textual media, graphical media, and the like—including combinations thereof. Each of these media elements consume not only network resources connecting the systems involved in a communication session but also processing resources at those systems.

During real-time communications between multiple parties, especially those having a large number of parties, the parties will take turns participating in the communication. Media for the communication that is being transferred from parties that are not currently contributing to the communication session is likely not pertinent to the communication session but may still be using communication resources.

OVERVIEW

Embodiments disclosed herein provide systems, methods, and computer readable media for managing bandwidth based on audio power level. In a particular embodiment, a method provides, from a conference system, transferring at least one audio level criterion to a first user system in a communication session. At the conference system, when a level of first audio for the communication session satisfies the at least one audio level criterion at the first user system, the method provides receiving the first audio encoded using first audio codec parameters by the first user system. At the conference system, when the level of the first audio does not satisfy the at least one audio level criterion at the first user system, the method provides receiving the first audio encoded using second audio codec parameters by the first user system.

In some embodiments, at the conference system, when the level of the first audio satisfies the at least one audio level criterion at the first user system, the method provides receiving first video encoded using first video codec parameters by the first user system. The first video comprises video corresponding to the first audio. Also at the conference system, when the level of the first audio does not satisfy the at least one audio level criterion at the first user system, the method provides receiving the first video encoded using second video codec parameters by the first user system.

In some embodiments, the first video encoded using the second video codec parameters uses less bandwidth to transfer than the first video encoded using the first video codec parameters.

In some embodiments, the first audio encoded using the second audio codec parameters uses less bandwidth to transfer than the first audio encoded using the first audio codec parameters.

In some embodiments, the second audio codec parameters comprise at least one parameter from a set including a lower frequency response than the first audio codec parameters, a lower target bitrate than the first audio codec parameters, no forward error correction, and a greater ptime than the first audio codec parameters.

In some embodiments, the at least one audio level criterion comprises a first threshold audio level and a second threshold audio level that is lower than the first threshold audio level, and the level of the first audio satisfies the at least one audio level criterion when the level of the first audio rises above the first threshold audio level and remains above the second threshold audio level.

In some embodiments, the method further provides transferring the first audio to at least one other user system on the communication session.

In some embodiments, at the conference system, the method provides receiving an indication of the level of the first audio from the first user system and determining the at least one audio level criterion based on the indication of the level of the first audio.

In some embodiments, the level of the first audio comprises an audio power level difference between speech and background noise.

In another embodiment, a conference system is provided that includes one or more computer readable storage media and a processing system operatively coupled with the one or more computer readable storage media. Also, the conference system includes program instructions stored on the one or more computer readable storage media that, when read and executed by the processing system, direct the processing system to transfer at least one audio level criterion to a first user system in a communication session. When a level of first audio for the communication session satisfies the at least one audio level criterion at the first user system, the program instructions direct the processing system to receive the first audio encoded using first audio codec parameters by the first user system. When the level of the first audio does not satisfy the at least one audio level criterion at the first user system, the program instructions direct the processing system to receive the first audio encoded using second audio codec parameters by the first user system.

In yet another embodiment, non-transitory computer readable media is provided having program instructions stored thereon for operating a user system to reduce resources used for communications. The program instructions, when read and executed by the user system, direct the user system to receive at least one audio level criterion from a conference system and capture first audio for a communication session. When a level of the first audio satisfies the at least one audio level criterion, the program instructions direct the user system to encode the first audio using first audio codec parameters and transfer the first audio to the conference system. When the level of the first audio does not satisfy the at least one audio level criterion, he program instructions direct the user system to encode the first audio using second audio codec parameters and transfer the first audio to the conference system.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates a communication environment for managing communication resources based on audio level.

FIG. 2 illustrates a method of operating in the communication environment to manage communication resources based on audio level.

FIG. 3 illustrates an operational scenario of the communication environment to manage communication resources based on audio level.

FIG. 6 illustrates a method of operating in the other communication environment to manage communication resources based on audio level.

FIG. 7 illustrates another method of operating in the other communication environment to manage communication resources based on audio level.

FIG. 8 illustrates a graph of a moving average audio power level versus time in an example scenario.

FIG. 9 illustrates another graph of a moving average audio power level versus time in an example scenario.

DETAILED DESCRIPTION

Figure 4:
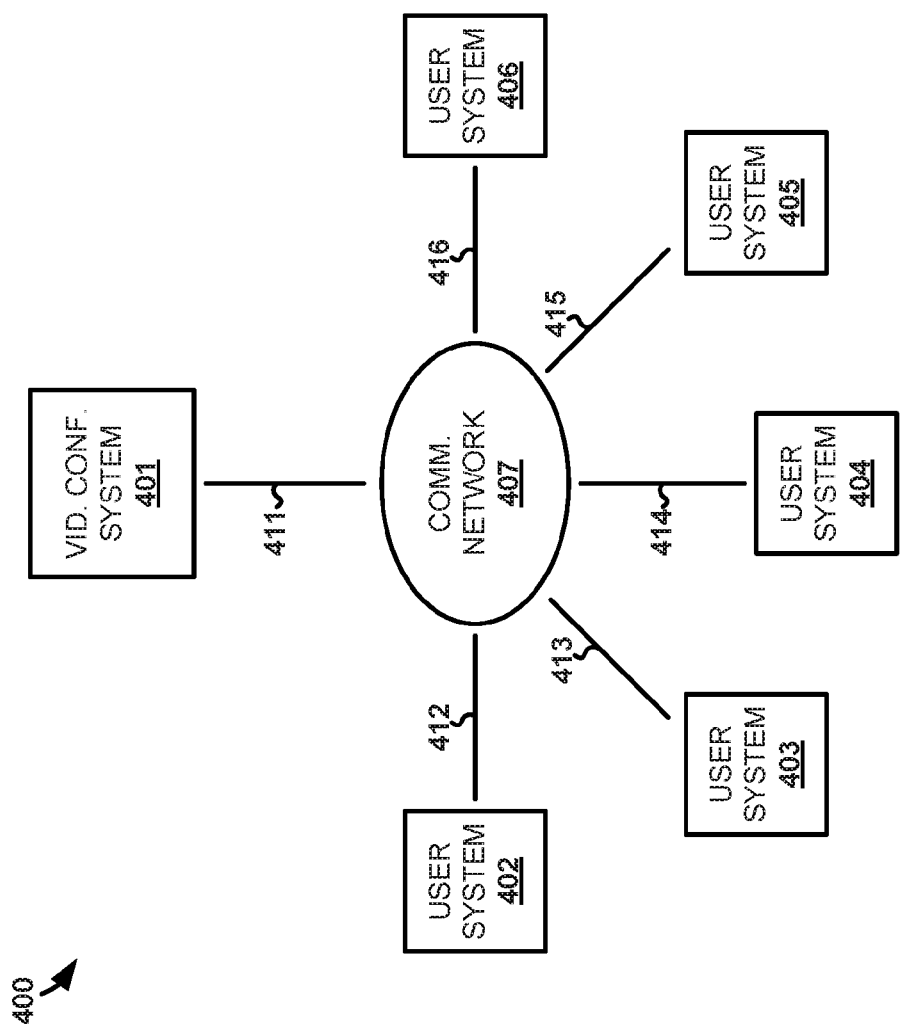
FIG. 4 illustrates another communication environment for managing communication resources based on audio level.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

The various embodiments disclosed herein provide for managing communication resources based on audio level. These resources may include network bandwidth resources, processing resources of systems involved in a communication session, or some other type of resource that is used when facilitating a communication session—including combinations thereof. Using less resources during a communication session may be beneficial due to physical limits on the resources, monetary cost of the resources, or any other reason for which minimizing the amount of resources used would be beneficial. More specifically, in many cases, data communication customers pay a premium for prioritizing certain data sent over data communication networks. During a communication session, minimizing the amount of data that is transferred for the communication session using prioritized network resources would most likely reduce monetary costs.

In the case of real-time communications, especially a communication session between many parties, very few parties on the communication session are talking within any given time period. For example, during a conference call, audio and/or video media is captured and streamed from one participant to other participants on the call and from those participants back to the one participant. If that one participant is not speaking, and thereby not contributing to the conference, over periods during call, then audio from the participant is less important and likely does not need to be presented to the other participants during those periods. Accordingly, communication environments described below adjust media transferred from end user systems that are not currently engaged (e.g. speaking) in a communication session to minimize the resources used by those end user systems.

FIG. 1 illustrates communication environment 100 for managing communication resources based on audio level. Communication environment 100 includes conference system 101, user system 102, and user system 103. Conference system 101 and user system 102 communicate over communication link 111. Conference system 101 and user system 103 communicate over communication link 112.

In operation, conference system 101 facilitates communication sessions between two or more user systems, such as user system 102 and user system 103. A communication session may include audio, video, presentation slides, desktop sharing, or any other type of media—including combinations thereof. As such, while system 101 is called a conference system, any type of communication session may be supported for the operations described herein, including communication types from traditional voice calls to player communications and media exchanges during a multiplayer videogame session. During a communication session, conference system 101 compiles media streams received from each user system on the communication session and distributes it to other user systems in an output media stream. If media streams received from any given user system does not meet criteria for including in the compilation, as may be the case if a user of the user system is not speaking in the received media stream, then that media stream is not included in the output stream. Likewise, given the limited display space on a user system, in the case of video communications, the output stream may include video from user systems of non-speakers in a smaller form or not at all, as may be the case if a user is not one of the most recent speakers. Also, in order to conserve more resources during the communication session, if a media stream from a user system will not qualify for inclusion in the output media stream from conference system 101, then that media stream is adjusted to use less resources before being transferred to conference system 101.

FIG. 2 illustrates a method 200 of operating in communication environment 100 to manage communication resources based on audio level. Method 200 provides conference system 101 transferring at least one audio level criterion to user system 102 (201). An audio level criterion may be a threshold audio level below which audio will not be included in the output media stream for a communication session. Other thresholds may be included as well to further increase granularity. The audio level may represent a total audio power level, an audio power level difference relative to background noise, or any other means of quantifying the strength of captured audio. In this example, the at least one audio level criterion is set such that a user's speech, when captured, will correspond to audio that satisfies the at least one criterion.

When a level of audio for the communication session captured by user system 102 satisfies the at least one audio level criterion, conference system 101 receives the audio encoded using first audio codec parameters by user system 102 (202). Alternatively, when the level of the audio does not satisfy the at least one audio level criterion, conference system 101 receives the audio encoded using second audio codec parameters by user system 102 (203). In one example, the codec used to encode the audio may be the Opus codec, although other codecs, such as Vorbis, AAC, and MP3, may also be used. The audio codec parameters may include a parameter defining a frequency response, a parameter defining a bitrate, a parameter designating whether to use forward error correction, a parameter defining a ptime (an Opus parameter), a parameter defining the codec to be used, or any other parameter that may effect how audio is encoded and decoded. Changing the parameters used to encode the audio will also change the amount of processing resources needed to encode and/or decode the audio and the amount of network resources (e.g. bandwidth) needed to transfer that audio.

Accordingly, in step 202 above, since the audio satisfies the at least one audio level criterion from conference system 101, the audio will qualify for inclusion in conference system 101's output media stream for the communication session. As such, the first audio parameters produce higher quality audio when used to encode the audio from user system 102 but also use more resources. In contrast, in step 203 above, since the audio does not satisfy the at least one audio level criterion, the audio will not qualify for inclusion in the output media stream from conference system 101. Thus, the second audio parameters produce lower quality audio when used to encode the audio from user system user system 102. However, the audio encoded using the second audio parameters uses less resources that the audio encoded using the first audio parameters.

As a user of user system 102 transitions between speaking and not speaking during the communication session, user system 102 transitions between encoding audio using the first and second parameters. When the user is not speaking the audio streamed from user system 102 uses less resources to encode and transfer to conference system 101 than when the user is speaking. Advantageously, by encoding and transferring audio to conference system 101 from user system 102 at a lower quality (i.e. using the second parameters) rather than not transferring the audio at all, audio from user system 102 can immediately be included in the output media stream of conference system 101 when audio captured by user system 102 qualifies for inclusion therein. As such, if the user of user system 102 begins speaking, that speech can be included in the media stream immediately even though it may take time for user system 102 to begin encoding the audio using the first parameters instead of the second. Otherwise, if no audio was sent at all, then the first part of what the user says when they begin speaking may not be included in the output media stream at all and is not heard by other parties on the communication.

In some cases, the second parameters may indicate that the audio from user system 102 should not be transferred and/or encoded at all. More specifically, an additional criterion (or more) included in the at least one audio level criterion may indicate that the audio should not be transferred and/or encoded. For example, the additional criterion may indicate that, if the audio level captured by user system 102 has not reached a level for inclusion in the output audio stream from conference system 101 in a defined amount of time, then user system 102 should not encode or transfer audio at all rather than merely at a lower quality. In these cases, the advantages of still transferring audio to conference system 102, as noted above, would be sacrificed under the assumption that it is not likely that the user will be participating in the communication session again for some time.

It should be understood that, in method 200, the functionality described with respect to user system 102 could also apply to user system 103. Likewise, method 200 could apply to any additional user system on a communication session facilitated by conference system 101.

FIG. 3 illustrates operational scenario 300 of communication environment 100 to manage communication resources based on audio level. While scenario 300 may be more beneficial during communication sessions having a greater number of user systems involved, scenario 300 only describes two user systems for clarity. In scenario 300, conference system 101 transfers at least one audio level criterion to both user system 102 and user system 103 at step 1. The at least one criterion indicates to user systems 102 and 103 at what audio level(s) will be included in an output media stream from conference system 101. The at least one audio level criterion may be transferred to user systems 102 and 103 in response to initiation or establishment of a communication session between user systems 102 and 103 or at some other time As user systems 102 and 103 capture audio during the communication session, user systems 102 and 103 determine a power level of the captured audio and determine whether that power level satisfies the at least one audio level criterion at step 2. The power level may be measured in decibels or in some other unit, which may be based upon the units used in the at least one audio power level criterion. The determined power level may be an absolute power level or may be a power level relative to background noise. The power level of the background noise may be measured at a time when it is determined that no one is talking at either user system 102 or 103.

At step 3, the audio captured by user systems 102 and 103 is encoded by each system based on whether the determined power level of the audio at each user system satisfies the at least one audio power level criterion. If the audio power level is such that the audio will be included in an output stream from conference system 101, then then the audio is encoded using first parameters for transfer to conference system 101. However, if the audio power level is such that the audio will not be included in the output stream from conference system 101, then the audio is encoded using second parameters for transfer to conference system 101, with the second parameters using less resources to encode and transfer audio than the first parameters.

After encoding, the audio is transferred in a media stream in real-time from each of user systems 102 and 103 to conference system 101 at step 4. As conference system 101 receives the media streams from each of user systems 102 and 103, conference system 101 compiles an output stream using audio that satisfies the at least one audio level criterion. In some cases, conference system 101 may determine the audio power level of each audio stream, may infer whether the audio power level satisfies the at least one criterion based on the parameters used to encode the audio, may receive an indicator of audio power level from each of user systems 102 and 103, may receive an indicator of whether the audio power level satisfies the at least one criterion from each of user systems 102 and 103, or determines which audio streams should be included in the output stream in some other way. As its compiled, the output media stream is included transferred in real-time to user systems 102 and 103 at step 5 to facilitate the communication session.

In other examples, the parameters used to encode video may also depend on the whether the capture audio satisfies the audio level criteria, as is discussed in more detail below. As such, in many video communication sessions, if audio will not be included in an output stream from conference system 101, then the corresponding video will likely not be included either or will be included at a lower quality, such as lower resolution, size, bitrate, etc. In some cases, such as those cases where the resources used by audio are considered negligible, the encoding parameters for the audio may remain constant while the encoding parameters for video still depend on whether the audio level criteria are satisfied.

Referring back to FIG. 1, conference system 101 comprises a computer processor system and communication interface. Conference system 101 may also include other components such as a router, server, data storage system, and power supply. Conference system 101 may reside in a single device or may be distributed across multiple devices. While shown separately, conference system 101 may be incorporated into one or more of user systems 102 and 103. Conference system 101 may be an audio communication server, video communication server, application server, personal computer workstation, network gateway system, or some other computing system—including combinations thereof.

User systems 102 and 103 each comprise a computer processor system and a communication interface. User systems 102 and 103 may further include at least one microphone or may be operatively coupled to at least one microphone for capturing audio. User systems 102 and 103 may also include other components such as a router, server, data storage system, and power supply. User systems 102 and 103 may each reside in a single device or may be distributed across multiple devices. User systems 102 and 103 may be a telephone, computer, tablet, conference room system, e-book, mobile Internet appliance, network interface card, media player, game console, application server, proxy server, or some other communication apparatus—including combinations thereof.

Communication links 111-112 use metal, glass, air, space, or some other material as the transport media. Communication links 111-112 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 111-112 could be direct links or may include intermediate networks, systems, or devices.

FIG. 4 illustrates communication environment 400 for managing communication resources based on audio level. Communication environment 400 includes videoconference system 401, user systems 402-406, and communication network 407. Videoconference system 401 and user systems 402-406 communicate with communication network 407 over communication links 411-416.

Communication network 407 comprises network elements that provide communications services to client devices 402-406 and videoconference system 401. Communication network 407 may comprise switches, wireless access nodes, Internet routers, network gateways, application servers, computer systems, communication links, or some other type of communication equipment—including combinations thereof. Communication network 407 may be a single network, such as a local area network, a wide area network, or the Internet, or may be a combination of multiple networks.

Figure 5:
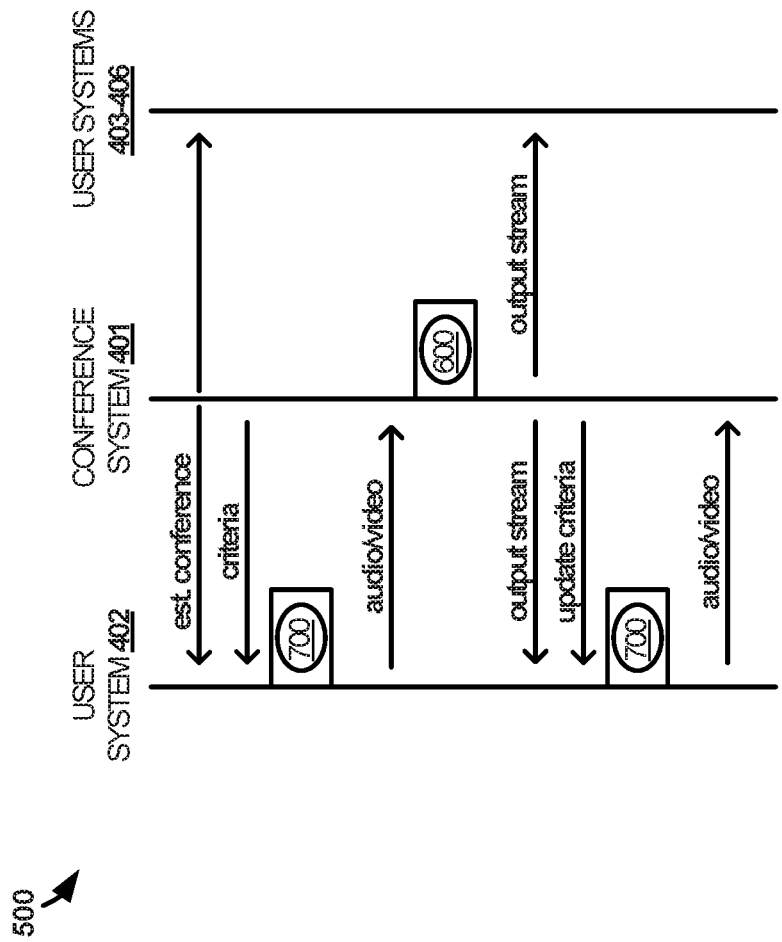
FIG. 5 illustrates an operational scenario of the other communication environment to manage communication resources based on audio level.

FIG. 5 illustrates operational scenario 500 of communication environment 300 to manage communication resources based on audio level. In scenario 500, a videoconference is established between user system 402 and user systems 403-406 with videoconference system 401 facilitating the videoconference. While scenario 500 is described with respect to specific user system 402, it should be understood that the same scenario may also be occurring with respect to each of user systems 403-406 as well during the videoconference. The video conference may be initiated by any one of user systems 402-406 or by videoconference system 401, possibly in response to the videoconference having been previously scheduled. The videoconference exchanges real-time audio and video communications between user systems 402-406 for their respective users as parties to the videoconference. Each user system may only have a single user or may have multiple users, as may be the case if a user system is located in a conference room. In some examples, if a particular user system is not equipped with hardware necessary video capture and/or display, then that user system may only participate in the videoconference using audio communications.

Once a videoconference has been established, videoconference system 401 transfers initial audio level criteria to user system 402. The initial audio level criteria define circumstances whereby audio captured by user system 402 will be included in videoconference system 401's output media stream for the videoconference. Likewise, in this example, the audio level criteria also apply to whether video will be included in the output media stream and/or the quality of that video if the video is included. The audio level criteria as it applies to parameters for encoding video may be the same as or may differ from the audio level criteria as it applies to parameters for encoding audio.

After receiving the initial audio level criteria, user system 402 performs method 700 illustrated in FIG. 7. In method 700, user system 402 captures audio of a user(s) or of any other noise that may be captured by a microphone (701). As user system 402 is capturing the audio, user system 402 determines the power level of the captured audio (702). The audio power level criteria are applied to the determined audio power level to determine which audio codec parameters should be used to encode the captured audio and which video codec parameters should be used to encode video captured by user system 402 that corresponds to the captured audio. For example, if the audio power level satisfies a given aspect the audio level criteria, the audio level criteria may indicate that first audio and video codec parameters should be used to encode the audio and video. The audio and video codec parameters may also be defined in the audio level criteria, may be preinstalled on user system 402, may be received from videoconference system 401 separately from the audio level criteria, or may reach user system 402 in some other manner. Once the audio and video codec parameters have been determined by the application of the audio level criteria, the audio and video are encoded using the respective audio and video parameters (704).

Referring back to scenario 500, the encoded audio and video is transferred in real-time to videoconference system 401 as data packets over communication network 407. Given the real-time nature of the videoconference communications, method 700 is performed continually by user system user system 402. As such, the parameters used to encode the audio and video that is transferred to videoconference system 401 may change at any given time during the videoconference depending on whether the audio captured by user system 402 satisfies one or more aspects of the audio level criteria.

Upon receiving the data packets carrying the encoded audio and video from user system 402, videoconference system 401 performs method 600 illustrated in FIG. 6. In method 600, videoconference system 401 determines the audio power level from the audio received in the data packets (601). Videoconference system 401, as noted above, will use the power level of the audio in the packets to determine whether and how audio and video from user system 402 should be included in the output media stream for the videoconference from videoconference system 401 (602). The criteria used by videoconference system 401 to determine what should be included in the output stream may be similar to the audio level criteria used by user system 402 in method 700. Due to this similarity, the audio and video transferred by user system 402 should already be encoded at a quality that efficiently uses communication resources between user system 402 and videoconference system 401 depending on whether/how the audio and video will be included in videoconference system 401's output media stream.

For example, if videoconference system 401 determines that the audio power level is not high enough for inclusion in the output media stream, as may be the case if no user at user system 402 is currently speaking, then user system 402 should have already encoded the audio using parameters that result in lower quality audio, which use less computational and bandwidth resources to encode and transfer. Likewise, the video in the preceding example may not be included in the output media stream or may be included at a lower quality (e.g. within a window smaller than the window of a speaking participant). Therefore, user system 402 should have already encoded the video using parameters that result in lower quality video, which also use less computational and bandwidth resources to encode and transfer. Additionally, in cases where the video will not be included in the output stream at all, user system 402 may not even send video to videoconference system 401 based on the audio level criteria. For instance, the output media stream may only include three video streams, if a user of user system 402 has not spoken more recently than users in streams from at least three other user systems, then videoconference system 401 may not include the video from user system 402 in the output media stream.

Additionally, videoconference system 401 determines whether the audio level criteria should be changed (603). For instance, audio and/or video may be encoded by user system 402 and transferred to videoconference system 401 using higher quality parameters even though videoconference system 401 ultimately decides that the audio and/or video should not be included in the output media stream. In that case, more resources were used to transfer audio and video to videoconference system 401 than necessary since the audio and video is not going to be included in the output media stream. Thus, videoconference system 401 may determine that the audio level criteria should be changed for at least user system 402 (604). Continuing the above example, power level thresholds in the audio level criteria may be changed to increase the audio power level required for audio and video to be encoded at higher quality. Alternatively, or additionally, the audio level criteria may be changed from applying to an absolute power level to applying to a power level relative to background noise.

Referring again to scenario 500, updates to the audio level criteria, if any, are transferred from videoconference system 401 to user system 402 and the output media stream is transferred to user system 402 and user systems 403-406, where it will be presented to its respective users in real-time for the videoconference. User system 402 then continues to perform method 700 in real-time using the updated criteria, if any was sent by videoconference system 401, and transfers the resulting encoded audio and video to videoconference system 401 in real-time.

Advantageously, having videoconference system 401 provide the audio level criteria to user system 402 allows user system 402 to make the initial determination as to whether the audio and video captured by user system 402 will be included in videoconference system 401's output media stream or at what quality. User system 402 can then encode the audio and video based on that determination. Encoding and transferring lower quality audio and video, or none at all in some cases, from user system 402 to videoconference system 401 reduces the computational and bandwidth resources between user system 402 and videoconference system 401 when higher quality audio and video is not needed for the output stream.

FIG. 8 illustrates an example graph 800 of moving average audio power level versus time. Audio power level curve 801 is an example of the audio power level for at least a portion of the audio captured by user system 402. Threshold 1 and threshold 2 are examples of criteria that may be included in the audio level criteria that is used by user system 402. Generally, if the audio power level is above threshold 1, then the audio and video will be encoded by user system 402 using higher quality codec parameters, if the audio power level is below threshold 2, then the audio and video will be encoded by user system 402 using lower quality codec parameters.

Power level curve 801 begins at time t0 below threshold 2 and the audio and video is therefore encoded using lower quality codec parameters by user system 402. Just before time t1, curve 801 exceeds threshold 2. However, the codec parameters do not change until the curve 801 exceeds threshold 1 at time t1 and user system 402 will begin to encode the audio and video using higher quality codec parameters. At time t2, the curve drops below threshold 1 but, since curve 801 remains above threshold 2, the higher quality codec parameters continue to be used. Once curve 801 drops below threshold 2 at time t3, user system 402 reverts back to using the lower quality codec parameters to encode the audio and video.

FIG. 9 illustrates an example graph 900 of moving average audio power level versus time. Audio power level curve 901 is an example of the audio power level for at least a portion of the audio captured by user system 402. In this example, three thresholds are included in the audio level criteria used by user system 402. Thresholds 1 and 2 operate similarly to that described above with respect to graph 800. However, threshold 3 corresponds to a third set of parameters for which audio and video may be encoded by user system 402. In some cases, this third set of parameters may correspond to not encoding or transferring audio and/or video to videoconference system 401 at all. For instance, as was the case in FIG. 8, when when the audio power level 901 drops below threshold 2 at time t3, then user system 402 reverts back to using the lower quality codec parameters to encode the audio and video. Then when the audio power level 901 drops below threshold 3 at time t4, user system 402 no longer encodes the audio and video at all for transfer and may instead simply send silence packets to videoconference system 401, which use a minimal amount of resources. In some examples, video may still be transferred (albeit likely at a lower quality) and merely the corresponding audio is sent as silence.

Figure 10:
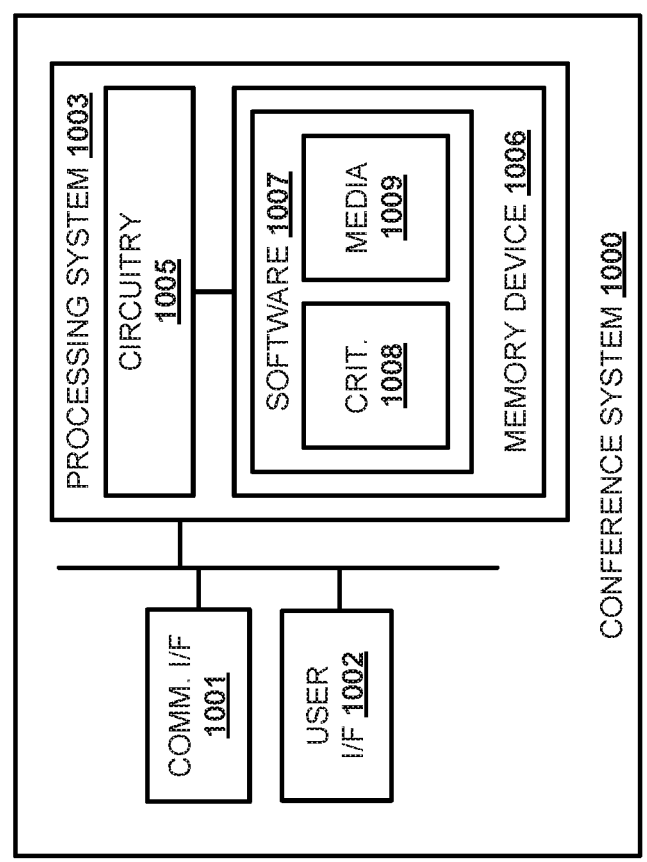
FIG. 10 illustrates a computing architecture for implementing a conference server system.

FIG. 10 illustrates conference system 1000. Conference system 1000 is an example of conference systems 101 and 401, although systems 101 and 401 may use alternative configurations. Conference system 1000 comprises communication interface 1001, user interface 1002, and processing system 1003. Processing system 1003 is linked to communication interface 1001 and user interface 1002. Processing system 1003 includes processing circuitry 1005 and memory device 1006 that stores operating software 1007.

Communication interface 1001 comprises components that communicate over communication links, such as network cards, ports, RF transceivers, processing circuitry and software, or some other communication devices. Communication interface 1001 may be configured to communicate over metallic, wireless, or optical links. Communication interface 1001 may be configured to use TDM, IP, Ethernet, optical networking, wireless protocols, communication signaling, or some other communication format—including combinations thereof.

User interface 1002 comprises components that interact with a user. User interface 1002 may include a keyboard, display screen, mouse, touch pad, or some other user input/output apparatus. User interface 1002 may be omitted in some examples.

Processing circuitry 1005 comprises microprocessor and other circuitry that retrieves and executes operating software 1007 from memory device 1006. Memory device 1006 comprises a non-transitory storage medium, such as a disk drive, flash drive, data storage circuitry, or some other memory apparatus. Operating software 1007 comprises computer programs, firmware, or some other form of machine-readable processing instructions. Operating software 1007 includes criteria module 1008 and media module 1009. Operating software 1007 may further include an operating system, utilities, drivers, network interfaces, applications, or some other type of software. When executed by circuitry 1005, operating software 1007 directs processing system 1003 to operate conference system 1000 as described herein.

In particular, criteria module 1008 directs processing system 1003 to transfer at least one audio level criterion to a first user system in a communication session. Media module 1009 directs processing system 1003 to, when a level of first audio for the communication session satisfies the at least one audio level criterion at the first user system, receive the first audio encoded using first audio codec parameters by the first user system. Media module 1009 further directs processing system 1003 to, when the level of the first audio does not satisfy the at least one audio level criterion at the first user system, receiving the first audio encoded using second audio codec parameters by the first user system.

Figure 11:
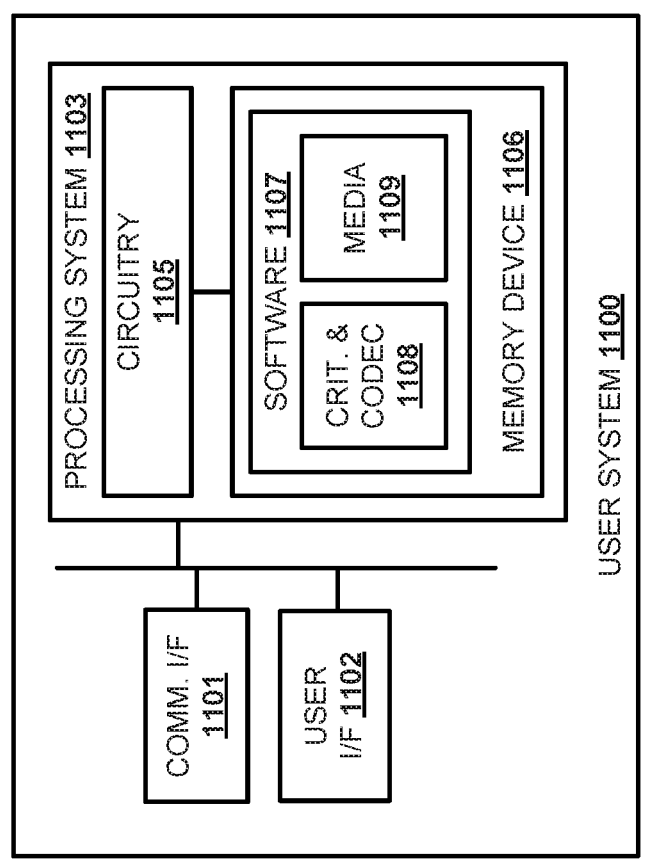
FIG. 11 illustrates a computing architecture for implementing a user system.

FIG. 11 illustrates user system 1100. User system 1100 is an example of user systems 101-102 and user systems 402-406, although those systems could use alternative configurations. User system 1100 comprises communication interface 1101, user interface 1102, and processing system 1103. Processing system 1103 is linked to communication interface 1101 and user interface 1102. Processing system 1103 includes processing circuitry 1105 and memory device 1106 that stores operating software 1107. User system 1100 may include other well-known components such as a battery and enclosure that are not shown for clarity. User system 1100 may be a telephone, computer, e-book, mobile Internet appliance, media player, game console, wireless network interface card, conference room system, or some other communication apparatus—including combinations thereof.

Communication interface 1101 comprises components that communicate over communication links, such as network cards, ports, RF transceivers, processing circuitry and software, or some other communication devices. Communication interface 1101 may be configured to communicate over metallic, wireless, or optical links. Communication interface 1101 may be configured to use TDM, IP, Ethernet, optical networking, wireless protocols, communication signaling, or some other communication format—including combinations thereof.

User interface 1102 comprises components that interact with a user to receive user inputs and to present media and/or information. User interface 1102 may include a speaker, microphone, buttons, lights, display screen, touch screen, touch pad, scroll wheel, communication port, or some other user input/output apparatus—including combinations thereof. User interface 1102 may be omitted in some examples.

Processing circuitry 1105 comprises microprocessor and other circuitry that retrieves and executes operating software 1107 from memory device 1106. Memory device 1106 comprises a non-transitory storage medium, such as a disk drive, flash drive, data storage circuitry, or some other memory apparatus. Processing circuitry 1105 is typically mounted on a circuit board that may also hold memory device 1106 and portions of communication interface 1101 and user interface 1102. Operating software 1107 comprises computer programs, firmware, or some other form of machine-readable processing instructions. Operating software 1107 includes criteria and codec module 1108 and media module 1109. Operating software 1107 may further include an operating system, utilities, drivers, network interfaces, applications, or some other type of software. When executed by processing circuitry 1105, operating software 1107 directs processing system 1103 to operate user system 1100 as described herein.

In particular, criteria and codec module 1108 directs processing system 1103 to receive at least one audio level criterion from a conference system. Media module 1108 directs processing system 1103 to capture first audio for a communication session. Criteria and codec module 1108 further directs processing system 1103 to, when a level of the first audio satisfies the at least one audio level criterion, encode the first audio using first audio codec parameters and, when the level of the first audio does not satisfy the at least one audio level criterion, encode the first audio using second audio codec parameters. Media module 1108 directs processing system 1103 to transfer the encoded first audio to the conference system.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of reducing resources used for communications, the method comprising:
   from a conference system, transferring at least one audio level criterion to a first user system in a communication session;
   at the conference system, when a level of first audio for the communication session satisfies the at least one audio level criterion at the first user system, receiving the first audio encoded using first audio codec parameters by the first user system;

at the conference system, when the level of the first audio does not satisfy the at least one audio level criterion at the first user system, receiving the first audio encoded using second audio codec parameters by the first user system.

2. The method of claim 1, further comprising:
at the conference system, when the level of the first audio satisfies the at least one audio level criterion at the first user system, receiving first video encoded using first video codec parameters by the first user system, wherein the first video comprises video corresponding to the first audio;
at the conference system, when the level of the first audio does not satisfy the at least one audio level criterion at the first user system, receiving the first video encoded using second video codec parameters by the first user system.

3. The method of claim 2, wherein the first video encoded using the second video codec parameters uses less bandwidth to transfer than the first video encoded using the first video codec parameters.

4. The method of claim 1, wherein the first audio encoded using the second audio codec parameters uses less bandwidth to transfer than the first audio encoded using the first audio codec parameters.

5. The method of claim 4, wherein the second audio codec parameters comprise at least one parameter from a set including a lower frequency response than the first audio codec parameters, a lower target bitrate than the first audio codec parameters, no forward error correction, and a greater ptime than the first audio codec parameters.

6. The method of claim 1, wherein the at least one audio level criterion comprises a first threshold audio level and a second threshold audio level that is lower than the first threshold audio level, and the level of the first audio satisfies the at least one audio level criterion when the level of the first audio rises above the first threshold audio level and remains above the second threshold audio level.

7. The method of claim 1, further comprising:
transferring the first audio to at least one other user system on the communication session.

8. The method of claim 1, further comprising:
at the conference system, receiving an indication of the level of the first audio from the first user system; and
determining the at least one audio level criterion based on the indication of the level of the first audio.

9. The method of claim 1, wherein the level of the first audio comprises an audio power level difference between speech and background noise.

10. A conference system for reducing resources used for communications, the conference system comprising:
one or more computer readable storage media;
a processing system operatively coupled with the one or more computer readable storage media; and
program instructions stored on the one or more computer readable storage media that, when read and executed by the processing system, direct the processing system to:
transfer at least one audio level criterion to a first user system in a communication session;
when a level of first audio for the communication session satisfies the at least one audio level criterion at the first user system, receive the first audio encoded using first audio codec parameters by the first user system;
when the level of the first audio does not satisfy the at least one audio level criterion at the first user system, receive the first audio encoded using second audio codec parameters by the first user system.

11. The conference system of claim 10, wherein the program instructions further direct the processing system to:
when the level of the first audio satisfies the at least one audio level criterion at the first user system, receive first video encoded using first video codec parameters by the first user system, wherein the first video comprises video corresponding to the first audio;
when the level of the first audio does not satisfy the at least one audio level criterion at the first user system, receive the first video encoded using second video codec parameters by the first user system.

12. The conference system of claim 11, wherein the first video encoded using the second video codec parameters uses less bandwidth to transfer than the first video encoded using the first video codec parameters.

13. The conference system of claim 10, wherein the first audio encoded using the second audio codec parameters uses less bandwidth to transfer than the first audio encoded using the first audio codec parameters.

14. The conference system of claim 13, wherein the second audio codec parameters comprise at least one parameter from a set including a lower frequency response than the first audio codec parameters, a lower target bitrate than the first audio codec parameters, no forward error correction, and a greater ptime than the first audio codec parameters.

15. The conference system of claim 10, wherein the at least one audio level criterion comprises a first threshold audio level and a second threshold audio level that is lower than the first threshold audio level, and the level of the first audio satisfies the at least one audio level criterion when the level of the first audio rises above the first threshold audio level and remains above the second threshold audio level.

16. The conference system of claim 10, wherein the program instructions further direct the processing system to:
transfer the first audio to at least one other user system on the communication session.

17. The conference system of claim 10, wherein the program instructions further direct the processing system to:
receive an indication of the level of the first audio from the first user system; and
determine the at least one audio level criterion based on the indication of the level of the first audio.

18. The conference system of claim 10, wherein the level of the first audio comprises an audio power level difference between speech and background noise.

19. A non-transitory computer readable media having program instructions stored thereon for operating a user system to reduce resources used for communications, the program instructions, when read and executed by the user system, direct the user system to:
receive at least one audio level criterion from a conference system;
capture first audio for a communication session;
when a level of the first audio satisfies the at least one audio level criterion, encode the first audio using first audio codec parameters and transfer the first audio to the conference system;
when the level of the first audio does not satisfy the at least one audio level criterion, encode the first audio using second audio codec parameters and transfer the first audio to the conference system.

20. The non-transitory computer readable media of claim 19, wherein the program instructions further direct the user system to:

capture video for the communication session that corresponds to the first audio;
when the level of the first audio satisfies the at least one audio level criterion, encode the video using first video codec parameters and transfer the video to the conference system;
when the level of the first audio does not satisfy the at least one audio level criterion, encode the video using second video codec parameters and transfer the video to the conference system.

* * * * *